United States Patent
Wenzel

[19]

[11] Patent Number: 6,134,125
[45] Date of Patent: Oct. 17, 2000

[54] AC AND DC INPUT POWER SUPPLY

[75] Inventor: Edward P. Wenzel, Northbrook, Ill.

[73] Assignee: STMicroelectronics, Inc., Carrollton, Tex.

[21] Appl. No.: 09/313,228

[22] Filed: May 17, 1999

[51] Int. Cl.[7] .................................................. H02M 5/458
[52] U.S. Cl. ............................................. 363/37; 363/142
[58] Field of Search ............................. 363/34, 37, 125, 363/126, 142, 143

[56] References Cited

U.S. PATENT DOCUMENTS

| | | | |
|---|---|---|---|
| 2,330,500 | 9/1943 | Leifer | 363/142 |
| 3,769,571 | 10/1973 | Wilkinson | 363/142 |
| 4,415,964 | 11/1983 | Scharfe | 363/142 |
| 4,641,234 | 2/1987 | Bonal | 363/142 |
| 4,754,416 | 6/1988 | Adams et al. | 364/514 |
| 5,126,652 | 6/1992 | Carlin | 323/267 |
| 5,241,217 | 8/1993 | Severinsky | 363/34 |
| 5,499,187 | 3/1996 | Smith | 363/142 |
| 5,584,715 | 12/1996 | Ehrenfels | 439/222 |
| 5,715,156 | 2/1998 | Yilmaz et al. | 363/142 |
| 5,740,026 | 4/1998 | Karol | 363/142 |
| 5,847,545 | 12/1998 | Chen et al. | 363/142 |
| 5,901,056 | 5/1999 | Hung | 363/142 |
| 5,982,652 | 11/1999 | Simonelli et al. | 363/142 |

*Primary Examiner*—Jeffrey Sterrett
*Attorney, Agent, or Firm*—Theodore E. Galanthay; Lisa K. Jorgenson; Christopher F. Regan

[57] ABSTRACT

An AC and DC input power supply includes an AC power supply circuit and an AC input for receiving a range of AC input voltages. A rectifier circuit is connected to the AC input. An isolation output transformer has first and second primary winding terminals and a low voltage winding section for connecting to a DC voltage input that is lower than the range of the DC voltage that is rectified from the range of AC input voltages. The rectifier circuit is connected to the first primary winding terminal of the isolation output transformer. A transistor is connected to the second primary winding terminal of the isolation output transformer. The DC power supply circuit includes a DC input that is selectably connectable between the first primary winding terminal when the voltage input to the DC input connector is a nominal DC voltage that is within the range of the DC bulk voltage and the low voltage winding section when the voltage input to the DC input is lower than the range of the DC bulk voltage.

30 Claims, 3 Drawing Sheets

AC AND DC INPUT POWER SUPPLY

FIELD OF THE INVENTION

This invention relates to DC power supplies that use AC or DC input voltages.

BACKGROUND OF THE INVENTION

Many electronic devices require a constant DC source in order to operate. The power to the electronic device can initially be supplied from a DC power source, such as from a DC-to-DC converter that receives its DC input from an AC-to-DC converter. Often, two separate power supplies are used when applications have an AC universal input requirement and a low voltage DC input requirement. For example, an application could require an AC universal input requirement where an AC voltage is converted to a DC output. This AC converter could have a range of AC input voltages. This, in turn, would create a range of DC voltage output values corresponding to the rectified voltage obtained from a range of AC input voltages. This is often known as the bulk voltage corresponding to the range of DC voltage that is produced by the AC input voltage. For example, a transformer could put out 150 to 400 volts. The nominal voltage is the DC voltage that is within the range of the DC bulk voltage produced by the AC input voltage. There could also be a low voltage DC input requirement, which is lower than the range of DC bulk voltage produced by the AC input output. The bulk voltage is that DC voltage that is obtained from the AC rectification. This DC voltage is lower than the range of the DC voltage produced by the AC input voltage. Typically, two separate power supplies are used, typically, one with a universal AC input and another DC-to-DC converter.

U.S. Pat. No. 5,126,652 to Carlin is directed to a power supply that is designed to operate over a wide range of both AC and DC input voltages and frequencies from 0 to 400 HZ. It can provide two regulated low voltage DC outputs that are based on accepting input voltages ranging from 12 to 240 volts DC or 24 to 240 volts AC. A high voltage n-channel MOSFET transistor controls the high voltage primary switching transistor. This device has a circuit that protects that transistor by providing a power-up in-rush clamping feature in a power supply circuit. This is accomplished by a bypass diode and a dynamic feedback circuit, which limits the switching current to approximately two times the nominal switching current.

However, the device of the '652 patent would not allow a single power supply to provide the desired isolation and operation from a full range of common input AC names and low (and nominal) DC input voltages.

SUMMARY OF THE INVENTION

It is therefore an object of the present invention to provide an AC and DC input power supply that provides isolation and operates from both a full range of common input AC voltage and a low (and nominal) DC input voltage.

In accordance with the present invention, an AC and DC input power supply includes an AC power supply circuit that includes an AC input for receiving a range of AC input voltages. A rectifier circuit is connected to the AC input. An isolation output transformer has first and second primary winding terminals. A low voltage winding section connects to a DC voltage input that is lower than the range of the DC bulk voltage that is rectified from the range of AC input voltages. The rectifier circuit is connected to the first primary winding terminal of the isolation output transformer. A transistor is connected to the second primary winding terminal of the isolation output transformer.

The AC and DC input power supply of the present invention also includes a DC power supply circuit. A DC input is selectably connectable between the first primary winding terminal when the voltage input to the DC input connector is a nominal DC voltage that is within the range of the DC bulk voltage, and the low voltage winding section when the voltage input to the DC input is lower than the range of the DC bulk voltage.

In still another aspect of the present invention, the low voltage winding section includes a separate transformer winding having one winding end connected to the second primary winding terminal and transistor, and another winding end operatively connected to the DC input. The low voltage winding section includes a tap off the isolation output transformer. The DC power supply circuit can further include a rectifier diode to block voltage when both the AC and DC voltages are input at the same time.

In still another aspect of the present invention, the power supply includes a switch connected within the DC power supply circuit between the rectifier diode and the isolation output transformer for selectable connection of the DC input connector. The rectifier diode is operative to block voltage on the transistor when a DC low voltage is received.

In still another aspect of the present invention, the rectifier diode is operative to block voltage on the first primary winding terminal of the isolation output transformer. The transistor can include a field effect transistor that includes gate, source and drain terminals. The drain can be connected to the second primary winding terminal and the source connected to ground. The DC input can include a hardwired connection from a DC power supply. A slidable connection access plate can be mounted on a housing to permit selectable connection of the DC input connector and the AC input connector. The first and second primary winding terminals further comprise pins on which connections can be soldered.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
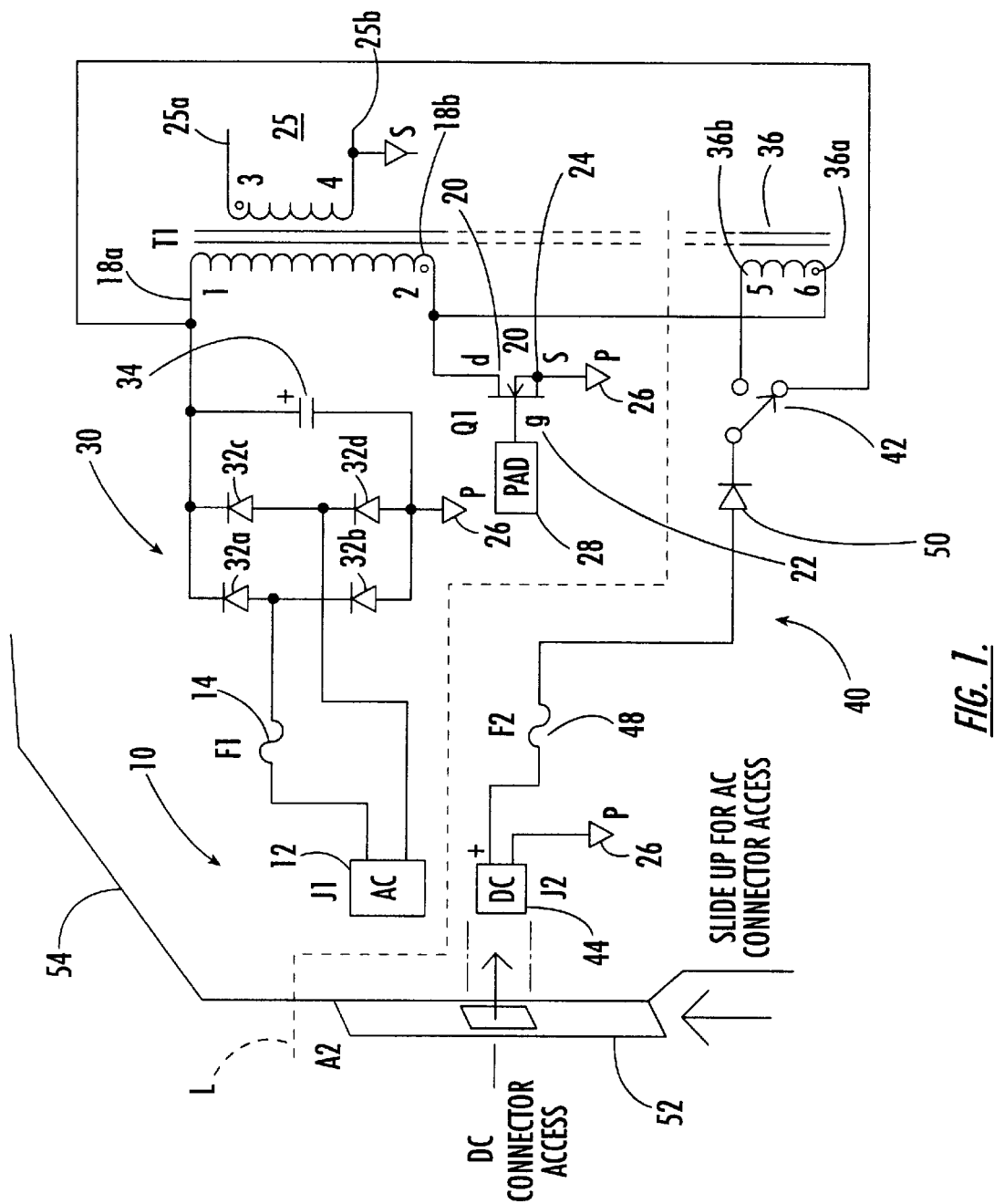
FIG. 1 is a schematic view of the AC and DC input power supply of the present invention showing a switch that is used such that the DC input is selectably connectable between the first primary winding terminal and the low voltage winding section.
Figure 2:
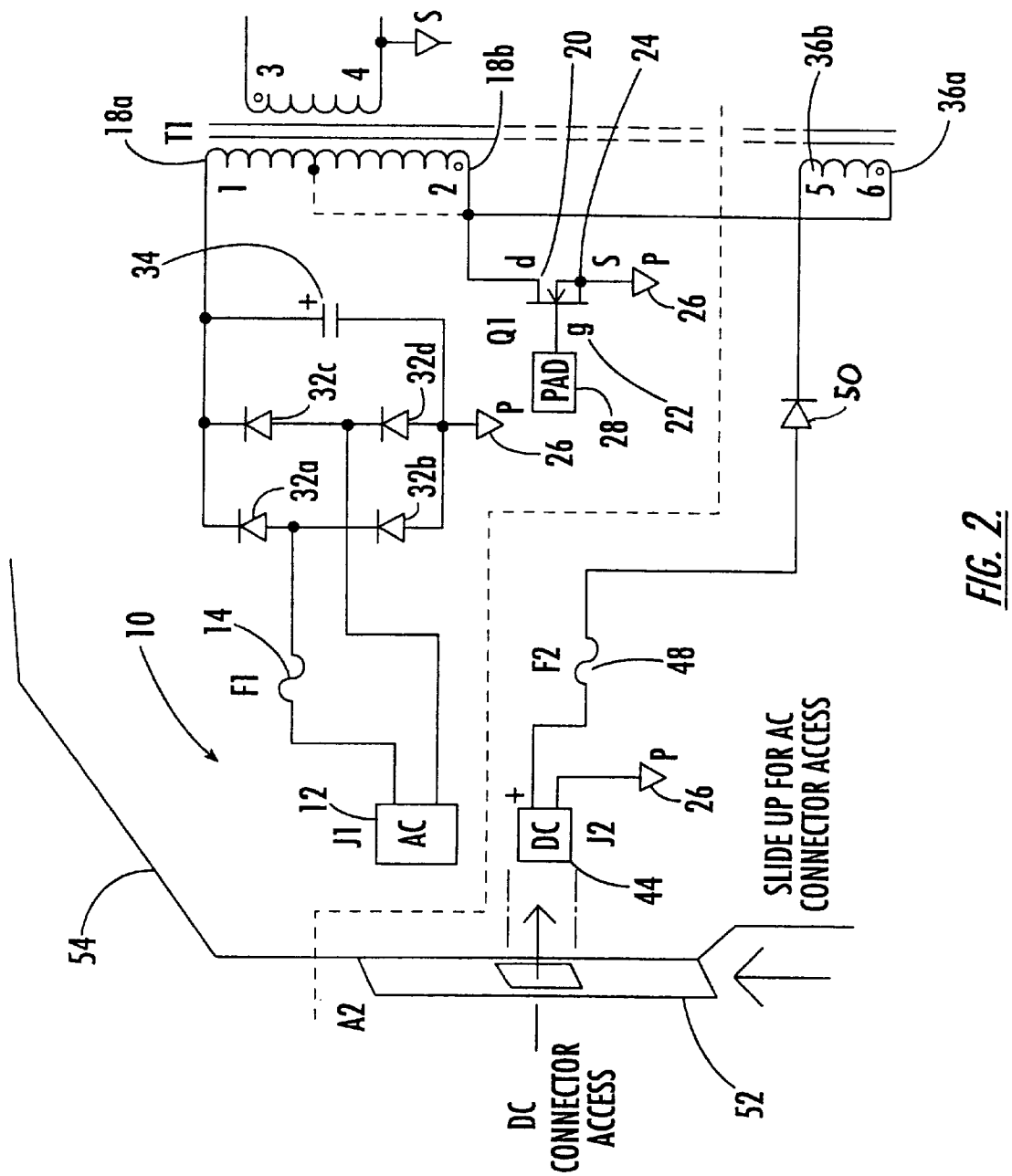
FIG. 2 is another schematic of the AC and DC input power supply without a switch where the DC input is connected directly to the low voltage winding section.
Figure 3:
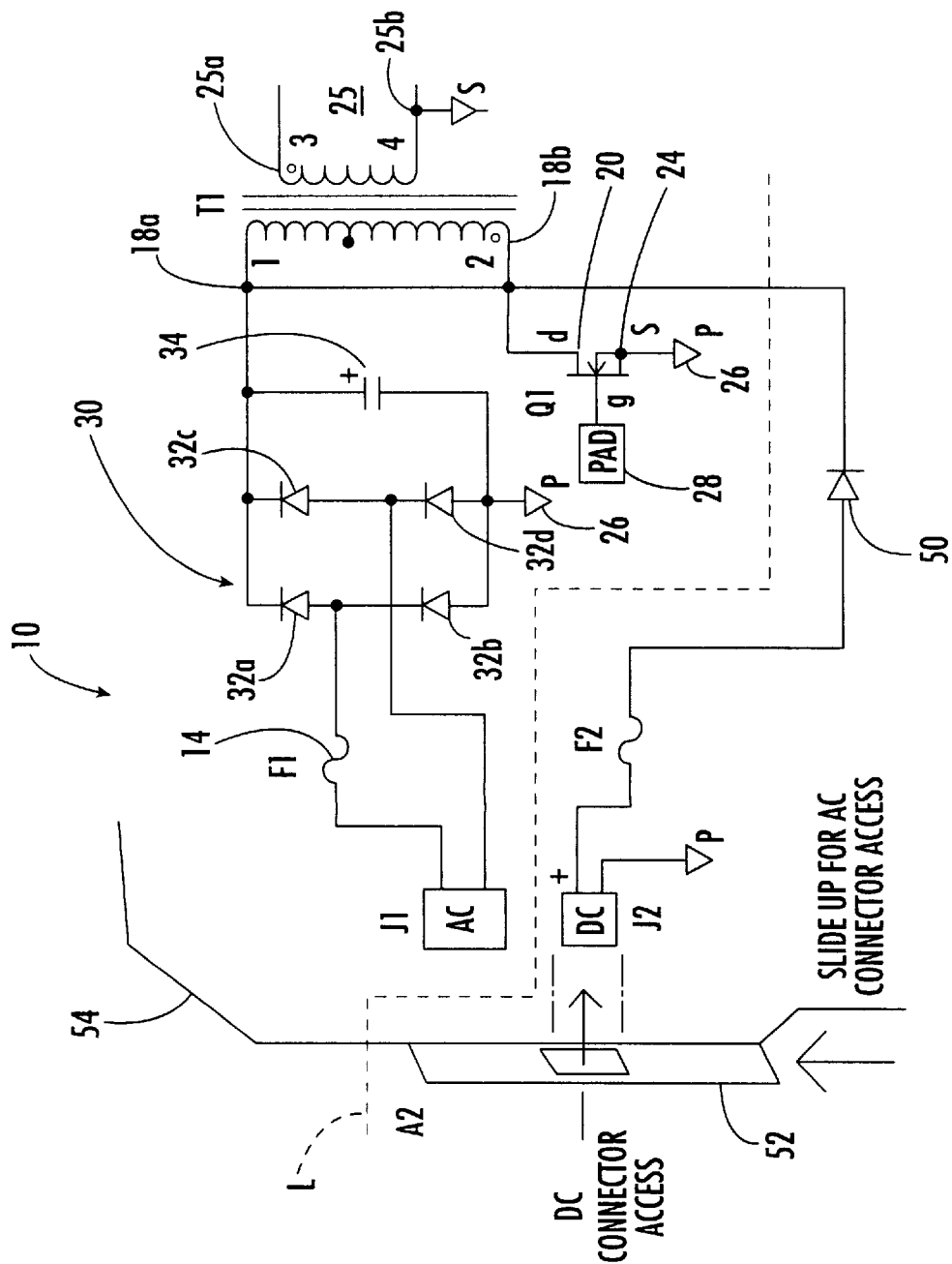
FIG. 3 is another schematic of the AC and DC input power supply showing the DC input connected directly to the first primary winding terminal.

Referring now to FIGS. 1–3, there are shown three different aspects of the present invention that illustrate the AC and DC input power supply. In all the figures, the circuit portion above the dashed line (L) represents a power supply circuit corresponding to an AC power supply circuit 10, which is used with a universal AC input voltage. This part of the circuit would include an AC input connector 12, an input fuse 14, an output transformer T1 (which provides isolation) and a transistor Q1, which in one preferred aspect of the present invention, is a field effect transistor having a drain 20, gate 22 and source 24, as is well known to those skilled in the art. The source 24 is connected to a ground corresponding to a primary return P 26 and the gate 22 is connected to a connection pad 28, forming a pin with a construction that is well known to those skilled in the art. In normal operation, the gate of Q1 will be switched on and off at an appropriate frequency to couple energy from the primary side of T1 to the load on the secondary side. The transformer T1 includes first and second primary winding terminals 18a, 18b and a secondary return 25 with first and second secondary winding terminals 25a, 25b.

A rectifier circuit 30 is also included, and is connected to the AC input connector 12 via the fuse 14 and receives a range of AC input voltages for rectification. The rectifier circuit includes four diodes 32a–d. Two sets of diodes 32a, 32b, 32c, 32c are in parallel to each other. A capacitor 34 is used as a filter with the rectifier circuit 30, as is well known to those skilled in the art.

As shown in FIG. 1, a low voltage winding section 36 on the transformer T1 allows connection to a DC voltage input that is lower than the range of the DC voltage that is rectified from the range of AC input voltages. This low voltage winding section forms a lower transformer primary inductance that allows the same output power. This low voltage winding section 36 could be a separate winding (as shown in FIG. 2) or a tap (shown by dotted lines) off the primary windings between the first and second primary winding terminals. In the lower DC voltage that is below the nominal voltage, more current will flow through the field effect transistor. The windings form part of a low voltage winding section. For example, the windings on the low voltage winding section could be formed from a larger wire size. The low voltage winding section 36 includes a first low voltage winding terminal 36a that is connected to the second primary winding terminal and the drain 20 of transistor Q1. A low voltage winding terminal 36b is connected to the DC power supply circuit 40, to be now explained, via in one embodiment a switch 42. The various terminals on the transformer T1 and low voltage winding section can be formed as pins (labeled 1–6) as illustrated.

In accordance with the present invention, the circuit under the dashed line (L) corresponds to the DC power supply circuit 40. FIG. 1 illustrates one aspect of the invention where the DC power supply circuit 40 includes a DC input formed as a connector 44 having a ground connection to primary 26. The input is connected to a fuse 48. A diode 50 is connected to the DC input connector 44. A switch 42 is connected to the diode 50 and allows DC input to be selectably connected to the first primary winding terminal 18a. The voltage input to the DC input connector is a nominal DC voltage that is within the range of the DC bulk voltage. The switch 42 is also connectable to the low voltage winding section when the voltage input to the DC input is lower than the range of the DC bulk voltage. An access panel or plate 52 can be mounted on a housing 54 to allow selective access to the AC or DC connector 12, 44. The plate 52 can slide as necessary.

FIG. 2 illustrates when the DC input corresponds to a low DC voltage that is below the bulk voltage. For purposes of understanding, the bulk voltage is that DC voltage that is obtained from the AC rectification. For example, the output from the AC side could be a range of 150 to 400 volts depending on the application, while the low DC voltage below bulk voltage could be 30 volts. For this low DC voltage input as shown in FIG. 2, a lower transformer primary inductance corresponds to the low voltage winding section 36 and is used to provide the same output power. The diode 50 is connected directly to the DC input connector 44. The other end of the diode 50 is connected to the second low voltage winding terminal 36b. The first low voltage winding terminal 36a is connected to the second primary winding terminal 18b. This circuit allows the power supply design for an AC input voltage to operate with the low DC voltage input. The current path on the primary side is from the DC source to the positive terminal of the DC connector 44, through the fuse 48 and diode 50 into the low voltage winding section 36 and then through the field effect transistor Q1 through the drain 20 and source 24 connection and back to the input connector.

FIG. 3 illustrates another aspect of the present invention where the input is connected directly to the first primary winding terminal 18a from the diode 50. The circuit of FIG. 3 allows a power supply design for the AC input voltage to operate with a nominal DC voltage input. The current path on the primary side is from the DC source through the positive terminal of the DC connector 44 and through the fuse 48 and diode 50 and into the primary windings of the transformer T1 via the first primary terminal connection 18a and through the transformer T1 and out through the second primary winding terminal 18b and into the field effect transistor Q through the drain 20 source 24 and back to the connector return.

Referring now to FIG. 2, various circuit functions are possible with different modifications of the circuit. For example, in a first scenario, the AC input or DC input voltages can be input, but not both at the same time. The diode 50 is not required because both input voltages are not connected at the same time. If the AC input and DC input voltages are connected at the same time, the DC input can be hardwired without using a connector. The diode 50 is used to block the voltage on the transistor Q1 through the drain and source and the access panel 52 is not required. This could be used for DC or battery back-up configuration.

In FIG. 3, corresponding to a nominal DC voltage, both AC and DC inputs can be connected at the same time and a fuse is used. In a first scenario, if the AC input or DC inputs are not used at the same time (the DC return may or may not be connected to a primary return). The diode 50 is not required because both input voltages are not connected at the same time. However, if both the AC input and DC input voltages are used at the same time, then the DC return may be connected to the primary return. The DC input can be hardwired without using the access panel 52 and the DC input can be hardwired without using the access panel. The diode 50 is used to block the voltage on the transformer T1, pin one. This could be a DC or battery back-up configuration.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the claims.

That which is claimed is:

1. An AC and DC input power supply comprising:
   an AC power supply circuit, and further comprising
   an AC input for receiving a range of AC input voltages;
   a rectifier circuit connected to the AC input;
   an isolation output transformer having first and second primary winding terminals, and a low voltage winding section for connecting to a DC voltage input that is lower than the range of the DC bulk voltage that is rectified from the range of AC input voltage, wherein said rectifier circuit is connected to the first primary winding terminal of said isolation output transformer;

a transistor connected to the second primary winding terminal of the isolation output transformer; and a DC power supply circuit, and further comprising
said DC input that is selectably connectable between the first primary winding terminal when the voltage input to the DC input connector is a nominal DC voltage that is within the range of the DC bulk voltage and the low voltage winding section when the voltage input to the DC input is lower than the range of the DC bulk voltage.

2. A power supply according to claim 1, wherein said low voltage winding section comprises a separate transformer winding having one winding end connected to the second primary winding terminal and transistor and another winding end operatively connected to the DC input.

3. A power supply according to claim 1, wherein said low voltage winding section comprises a tap off the isolation output transformer.

4. A power supply according to claim 1, wherein said DC power supply circuit further comprises a rectifier diode to block voltage when both AC and DC voltages are input at the same time.

5. A power supply according to claim 4, and further comprising a switch connected within said DC power supply circuit between said rectifier diode and isolation output transformer for selectable connection of said DC input connector.

6. A power supply according to claim 4, wherein said rectifier diode is operative to block voltage on the transistor when a DC low voltage is received.

7. A power supply according to claim 6, wherein said rectifier diode is operative to block voltage on the first primary winding terminal of the isolation output transformer.

8. A power supply according to claim 1, wherein said transistor further comprises a field effect transistor that includes a gate, source and drain terminals, wherein said drain is connected to said second primary winding terminal and said source is connected to ground.

9. A power supply according to claim 1, wherein said DC input comprises a hard wired connection from a supply of DC power.

10. A power supply according to claim 1, and further comprising a slidable connection access plate to permit selectable connection of the DC input connector and AC input connector.

11. A power supply according to claim 1, wherein said first and second primary winding terminals further comprises pins on which connections can be soldered.

12. A universal AC and DC input power supply comprising:

an AC power supply circuit and further comprising
an AC input for receiving a range of AC input voltages;
a rectifier circuit connected to the AC input;
an isolation output transformer having first and second primary winding terminals and a low voltage winding section having first and second low voltage winding terminals, wherein said first low voltage winding terminal is connected to said second primary winding terminal and said rectifier circuit is connected to the first primary winding terminal of said isolation output transformer;

a transistor connected to the second primary winding terminal of the isolation output transformer; and a DC power supply circuit and further comprising
a DC input through which a DC voltage is introduced that is lower than the range of the DC bulk voltage; and
a diode having one end connected to the DC input and the other end connected to the second low voltage winding terminal.

13. A power supply according to claim 12, wherein said low voltage winding section comprises a separate transformer winding having one winding end connected to the second primary winding terminal and transistor and another winding end operatively connected to the DC input.

14. A power supply according to claim 12, wherein said low voltage winding section comprises a tap off the isolation output transformer.

15. A power supply according to claim 12, wherein said diode connected to said DC input and second low voltage winding terminal blocks voltage when both AC and DC voltages are input at the same time.

16. A power supply according to claim 15, wherein said rectifier diode is operative to block voltage on the transistor when a DC low voltage is received.

17. A power supply according to claim 15, wherein said rectifier diode is operative to block voltage on the first primary winding terminal of the isolation output transformer.

18. A power supply according to claim 12, wherein transistor further comprises a field effect transistor that includes a gate, source and drain terminals, wherein said drain is connected to said second primary winding terminal and said source is connected to ground.

19. A power supply according to claim 12, wherein said DC input comprises a hard wired connection from a DC supply of power.

20. A power supply according to claim 12, and further comprising a slidable connection access plate to permit selectable connection of the DC input connector and AC input connector.

21. A power supply according to claim 12, wherein said first and second primary winding terminals further comprises pins on which connections can be soldered.

22. A universal AC and DC input power supply comprising:

an AC power supply circuit and further comprising
an AC input for receiving a range of AC input voltages;
a rectifier circuit connected to the AC input;
an isolation output transformer having first and second primary winding terminals, wherein said rectifier circuit is connected to the first primary winding terminal of said isolation output transformer;

a transistor connected to the second primary winding terminal of the isolation output transformer; and a DC power supply circuit and further comprising
a DC input through which a DC voltage input is input that is lower than the range of any DC bulk voltage that is rectified from the range of AC input voltages; and
a diode having one end connected to the DC input and the other end connected to the second low voltage winding terminal.

23. A power supply according to claim 22, wherein said diode connected to said DC input and second low voltage winding terminal blocks voltage when both AC and DC voltages are input at the same time.

24. A power supply according to claim 22, and further comprising a switch connected within said DC power supply circuit between said rectifier diode and isolation output transformer for selectable connection of said DC input connector.

25. A power supply according to claim 22, wherein said rectifier diode is operative to block voltage on the transistor when a DC low voltage is received.

26. A power supply according to claim 22, wherein said rectifier diode is operative to block voltage on the first primary winding terminal of the isolation output transformer.

27. A power supply according to claim 22, wherein transistor further comprises a field effect transistor that includes a gate, source and drain terminals, wherein said drain is connected to said second primary winding terminal and said source is connected to ground.

28. A power supply according to claim 22, wherein said DC input comprises a hard wired connection from a DC supply of power.

29. A power supply according to claim 22, and further comprising a slidable connection access plate to permit selectable connection of the DC input connector and AC input connector.

30. A power supply according to claim 22, wherein said first and second primary winding terminals further comprises pins on which connections can be soldered.

* * * * *